United States Patent
Van Eibergen et al.

(10) Patent No.: US 9,676,941 B2
(45) Date of Patent: Jun. 13, 2017

(54) RUBBER COMPOSITION BASED ON A SILICONE ELASTOMER AND ON A PCM, PROCESS FOR THE PREPARATION THEREOF, FLEXIBLE ELEMENT AND THERMAL CONTROL/REGULATING SYSTEM INCORPORATING SAME

(71) Applicant: Hutchinson, Paris (FR)

(72) Inventors: Arthur Van Eibergen, Montargis (FR); Benjamin Swoboda, Bois le Roi (FR); Benoit Le Rossignol, Montargis (FR); Christophe Dominiak, Varennes-Changy (FR)

(73) Assignee: Hutchinson, Paris (FR)

( * ) Notice: Subject to any disclaimer, the term of this patent is extended or adjusted under 35 U.S.C. 154(b) by 817 days.

(21) Appl. No.: 13/940,542

(22) Filed: Jul. 12, 2013

(65) Prior Publication Data

US 2014/0030458 A1   Jan. 30, 2014

(30) Foreign Application Priority Data

Jul. 25, 2012   (FR) .................................. 12 57218

(51) Int. Cl.

| | | |
|---|---|---|
| *C08L 83/04* | (2006.01) | |
| *C08G 77/16* | (2006.01) | |
| *C08G 77/18* | (2006.01) | |
| *C08G 77/20* | (2006.01) | |
| *C08L 83/00* | (2006.01) | |
| *C08L 83/06* | (2006.01) | |
| *C09K 5/06* | (2006.01) | |
| *F16L 11/04* | (2006.01) | |
| *C08K 5/09* | (2006.01) | |
| *F28D 20/02* | (2006.01) | |
| *C08K 3/08* | (2006.01) | |

(52) U.S. Cl.
CPC .............. *C08L 83/04* (2013.01); *C08G 77/16* (2013.01); *C08G 77/18* (2013.01); *C08G 77/20* (2013.01); *C08K 5/09* (2013.01); *C08L 83/00* (2013.01); *C08L 83/06* (2013.01); *C09K 5/063* (2013.01); *F16L 11/04* (2013.01); *F28D 20/02* (2013.01); *C08K 3/08* (2013.01); *Y02E 60/145* (2013.01); *Y10T 428/1386* (2015.01)

(58) Field of Classification Search
CPC .......... C08L 83/04; C08L 83/00; C08L 83/06; C08K 3/08; C08K 5/09; Y10T 428/1386; C08G 77/18; C08G 77/16; C08G 77/20; C08G 77/12; B01J 23/40
See application file for complete search history.

(56) References Cited

U.S. PATENT DOCUMENTS

| | | | |
|---|---|---|---|
| 5,816,493 A | 10/1998 | Pirkle | |
| 6,096,413 A * | 8/2000 | Kalinoski | .............. F16J 15/064 174/358 |
| 7,488,773 B2 | 2/2009 | Pause | |
| 2012/0133072 A1* | 5/2012 | Bunyan | ................... C08L 83/04 264/104 |

FOREIGN PATENT DOCUMENTS

| | | |
|---|---|---|
| EP | 1 067 164 A1 | 1/2001 |
| WO | WO-01/53425 A2 | 7/2001 |

OTHER PUBLICATIONS

Search Report for French Application No. 1257218; dated Nov. 15, 2012.

* cited by examiner

*Primary Examiner* — Walter B Aughenbaugh
(74) *Attorney, Agent, or Firm* — Alston & Bird LLP

(57) ABSTRACT

A crosslinked rubber composition, process for preparing same, and a flexible component based on at least one room-temperature vulcanizing "RTV" silicone elastomer and including at least one phase change material (PCM) is provided. The flexible element includes at least one elastomer layer capable of storing thermal energy and of releasing it which includes the crosslinked rubber composition. Also provided is a thermal control or regulating system incorporating the flexible element. The composition is such that the silicone elastomer has a viscosity measured at 23° C. according to the ISO 3219 standard which is less than or equal to 5000 mPa·s. The silicone elastomer includes two components A and B and is crosslinked by polyaddition or polycondensation, and the composition includes the PCM, which is not encapsulated and is in the micronized state, in an amount of greater than 50 phr (phr: parts by weight per hundred parts per elastomer(s)).

26 Claims, No Drawings

RUBBER COMPOSITION BASED ON A SILICONE ELASTOMER AND ON A PCM, PROCESS FOR THE PREPARATION THEREOF, FLEXIBLE ELEMENT AND THERMAL CONTROL/REGULATING SYSTEM INCORPORATING SAME

FIELD

The present invention relates to a crosslinked rubber composition based on at least one room-temperature vulcanizing (RTV) silicone elastomer and comprising at least one phase change material (PCM), to a process for preparing this composition, to a flexible element comprising at least one elastomer layer capable of storing thermal energy and of releasing it which consists of this composition, and to a thermal control or regulating system incorporating at least one such flexible element. The invention applies, nonlimitingly, in particular to systems for passive air conditioning of a building, for warming a passenger compartment or an engine of a vehicle, or else for warming submerged pipelines.

BACKGROUND

The incorporation of PCM materials such as fatty acids, salts or paraffins in particular into polymeric matrices for releasing or absorbing heat via a change of state owing to the latent heat of fusion which characterizes these PCMs has been known for a long time. Indeed, these PCMs have the advantage of changing from the liquid state to the solid state while releasing heat during the crystallization thereof, and conversely of changing from the solid state to the liquid state while absorbing heat during the melting thereof. It is known, nonlimitingly, to use these PCMs in powder form with nodules dispersed in a thermoplastic or elastomer matrix, or by encapsulating them in microspheres, for example plastic microspheres, or else by grafting them to a support.

Document U.S. Pat. No. 7,488,773 presents crosslinked rubber compositions for example for buildings, motor vehicles or the thermal protection of products, which were prepared from a two-component RTV silicone elastomer with the name ELASTOSIL® RT 621 in which a PCM was dispersed. More specifically, this PCM is of non-encapsulated type and, in the examples for the preparation of these compositions, it consists of n-hexadecane, eicosane or a lithium salt which all have melting points below 40° C., it being specified that this PCM is melted in order to mix it in the liquid state with that of the components of the silicone elastomer which comprises the crosslinking agent. As regards the weight fraction of PCM in these compositions thus prepared, it is 30%, which is equivalent to an amount of PCM of around only 43 phr (phr: parts by weight per hundred parts of silicone elastomer).

One major drawback of the compositions prepared in that document lies in the reduced amount of PCM—much less than 100 phr—that it is possible to disperse in this silicone elastomer, which is detrimental in particular to the change of state enthalpy per unit mass ΔH obtained for these compositions (which is between 50 J/g and 70 J/g only in the examples from that document) and therefore the ability of these compositions to absorb and release the thermal energy required by certain applications and environments that are particularly demanding as regards warming a space or fluid, for example.

SUMMARY

One objective of the present invention is to provide a crosslinked rubber composition based on at least one room-temperature vulcanizing (RTV) silicone elastomer and comprising at least one PCM, which overcomes this drawback while having sufficient flexibility for the aforementioned applications, and this objective is achieved in that the applicant has just unexpectedly discovered that the use of an "RTV" silicone elastomer of very reduced dynamic viscosity compared to that of the aforementioned ELASTOSIL® RT 621 elastomer, makes it possible to use amounts of PCM in the dispersed state in the composition which are much higher than those that can be used in the aforementioned document and therefore to give this composition a change of state enthalpy per unit mass ΔH that is much higher than those obtained in that document.

DETAILED DESCRIPTION

For this purpose, a composition according to the invention is such that said at least one silicone elastomer has a dynamic viscosity measured at 23° C. according to the ISO 3219 standard which is less than or equal to 5000 mPa·s, and advantageously less than or equal to 4000 mPa·s. More advantageously still, this viscosity thus measured is less than or equal to 3000 mPa·s or even 2000 mPa·s, and it is preferably less than or equal to 1000 mPa·s.

It will be noted that this particularly reduced viscosity of the or each silicone elastomer used advantageously makes it possible to use, in the composition, more than 50 phr of said at least one PCM that is not encapsulated and is in the micronized and dispersed state, and, more advantageously still, this (these) PCM(s) in an amount inclusively between 100 phr and 300 phr (phr: parts by weight per hundred parts of elastomer(s)). By way of comparison, the viscosity of the ELASTOSIL® RT 621 elastomer used in the aforementioned document, measured at 23° C. according to this ISO 3219 standard, is 15 000 mPa·s.

It results from this high amount of PCM in the composition according to the invention that the latter may have a change of state enthalpy per unit mass ΔH of greater than 70 J/g and advantageously between 80 J/g and 200 J/g.

It will also be noted that this particularly reduced viscosity of the or each silicone elastomer used advantageously makes it possible to use, in the composition, at least one thermally conductive filler in an amount of greater than 50 phr, it then being possible for the composition to have a thermal conductivity of greater than 0.2 $W \cdot m^{-1} K^{-1}$ and advantageously greater than 1 $W \cdot m^{-1} K^{-1}$.

It will also be noted that the RTV silicone elastomer(s) used in the compositions of the invention have the two-fold advantage of being crosslinkable at low temperature (i.e. at a temperature typically between 30° C. and 40° C. only) and of giving this composition, in use, a relatively high temperature resistance (typically at a temperature that may reach 250° C.).

More advantageously still, said at least one thermally conductive filler may be present in the composition in an amount inclusively between 150 phr and 200 phr and is preferably chosen from the group consisting of metals such as copper, aluminum and silver, metal oxides such as zinc oxide, nitrides such as boron nitride, aluminum nitride and silver nitride, carbon-based materials such as graphite, graphene and carbon nanotubes, and mixtures thereof.

Advantageously, said at least one silicone elastomer may be of the type having two components A and B and is crosslinked by polyaddition or polycondensation. Preferably, said at least one silicone elastomer is crosslinked by polyaddition with said components A and B and comprises a platinum-based catalyst.

Also advantageously, said at least one silicone elastomer may have a density, measured at 23° C. according to the ISO 2781 standard, which is less than 1.1 g/cm$^3$.

According to one preferred exemplary embodiment of the invention, said at least one PCM preferably comprises a fatty acid, such as stearic acid, is being specified that it is possible to use, as PCM in the composition, a mixture of several saturated and/or unsaturated fatty acids comprising, for example, stearic acid. However, it will be noted that PCMs for example chosen from hydrated salts or metal salts, paraffins and/or polyolefins can also be used in a composition according to the invention.

Preferably, said or each PCM used has at least one melting point above 50° C. and for example above 80° C. (for example in the vicinity of 100° C.), unlike the PCMs from the aforementioned prior art document, is being specified that PCMs of bimodal type (i.e. having two melting points) can in particular be used.

It will be noted that this use of one or more PCMs having melting point(s) in the vicinity of 100° C. would not be possible if use was made of an elastomer crosslinkable at high temperature (i.e. typically at more than 150° C.) and not at ambient temperature, as in the present invention.

The expression rubber composition "based on at least one room-temperature vulcanizing silicone elastomer" is understood in the present description to mean a composition having an elastomer matrix that predominantly consists (i.e. in an amount of greater than 50 phr, preferably greater than 75 phr) of one or more RTV silicone elastomers. In other words, a composition according to the invention could have its elastomer matrix comprising one or more silicone elastomers in a total amount of greater than 50 phr and optionally one or more other elastomers (i.e. elastomers other than RTV silicone elastomers) in a total amount of less than 50 phr, it being specified that the elastomer matrix of a composition according to the invention preferably exclusively consists of one or more RTV silicone elastomers.

Generally, the compositions of the invention may also comprise all or some of the additives customarily used in rubber compositions, such as, nonlimitingly, flame retardants (e.g. phosphorus-containing or halogenated flame retardants), anti-ageing agents (e.g. UV stabilizers and antioxidants), reinforcing fillers and/or plasticizers.

A process according to the invention for preparing a rubber composition as defined above essentially comprises a room-temperature mixing of two components A and B, in the liquid state, of said at least one RTV silicone elastomer and of said at least one non-encapsulated and powdered PCM, and a crosslinking of the mixture thus obtained, also at room temperature, by polyaddition or polycondensation.

It will be noted that this (these) PCMs used in powder form have the advantage of entailing a reduced cost for the preparation of this composition, compared to processes using encapsulated PCMs or else those that first melt non-encapsulated PCMs before the mixing thereof in the liquid state with the two components of the RTV silicone elastomer.

Preferably, this mixing of the PCM powder is carried out in a blade mixer in order to obtain the crosslinkable liquid mixture wherein said at least one PCM is dispersed in the micronized state, this liquid mixture is poured into a mold and this mixture is crosslinked therein for several hours.

A flexible element according to the invention may be tubular or in sheet form and comprises at least one elastomer layer which is capable of storing thermal energy and of releasing it and which consists of a crosslinked rubber composition as defined above having a Shore A hardness between 20 and 90.

A thermal control or regulating system according to the invention can in particular be used for the passive air conditioning of a building, for warming a passenger compartment or an engine of a motor vehicle, aircraft or spacecraft, for the thermal regulation of a battery (for example a lithium-ion battery), or for warming submerged pipelines, for example submarine pipelines transporting a fluid such as an oil or petroleum, and this system incorporates at least one such flexible element.

Solely by way of example, a composition according to the invention may be used in a pipe which forms this flexible element and which is included in a thermal regulating circuit of a heat engine of a motor vehicle, for example transferring an engine coolant. One particularly advantageous application example of such a pipe for coolant relates to the warming of this liquid during the restarting of the vehicle engine. Specifically, after the engine has been switched off, the coolant remains at a relatively high temperature of around 70° C. to 90° C. for a certain time, which means that the molten PCM releases heat into this liquid, which is therefore already relatively hot when the engine is restarted. This results in a reduction in the emissions of carbon dioxide at the exhaust and in the overconsumption of fuel, compared to what is observed with a cold engine.

Other features, advantages and details of the present invention will emerge on reading the following description of an exemplary embodiment of the invention given by way of illustration and nonlimitingly.

The applicant prepared two crosslinked rubber compositions, respectively "control" C0 and according to the invention C1, the formulations of which (expressed in phr, i.e. in parts by weight per hundred parts of elastomer matrix, consisting here of one and the same RTV silicone elastomer) are listed in table 1 below and the properties of which are presented in table 2 below (the mechanical properties were measured at 23° C. according to the ISO 37 standard or its ASTM D 412 equivalent).

The "control" composition C0 exclusively consists of an RTV silicone elastomer with the name ELASTOSIL® RT 604 A/B having two components A (containing a platinum-based catalyst) and B (containing the crosslinking agent), that crosslinks by addition of A and B. The viscosity of this elastomer, measured at 23° C. according to the ISO 3219 standard, is around 800 mPa·s and its density, measured at 23° C. according to the ISO 2781 standard, is 0.97 g/cm$^3$. Thus, this composition C0 is devoid of any PCM.

The composition C1 according to the invention comprises, besides this ELASTOSIL® RT 604 A/B elastomer, stearic acid in micronized powder form as PCM (this PCM has a melting point Tm of 56° C.) and micronized aluminum powder with the name MEP105 as thermally conductive filler.

In order to prepare the composition C1, two components A and B, in the liquid state, of this silicone elastomer and non-encapsulated powdered stearic acid were mixed at room temperature (at around 30° C.) in a blade mixer, then were crosslinked by polyaddition in a mold for around 24 hours, also at ambient temperature, after the liquid mixture obtained by this mixing was poured into this mold.

TABLE 1

| Ingredients | Composition C0 | Composition C1 |
|---|---|---|
| | (in phr) | |
| ELASTOSIL ® RT 604 A/B | 100 | 100 |
| Micronized stearic acid | — | 250 |
| Micronized aluminum MEP105 | — | 150 |

TABLE 2

| Properties | C0 | C1 |
|---|---|---|
| | Thermal properties | |
| Thermal conductivity (W · m$^{-1}$K$^{-1}$) | 0.20 | 0.57 |
| Latent heat (J/g) | — | 130 |
| Transition temperature (° C.) | — | 56 (melting point of stearic acid) |

As can be seen in this table 2, the composition C1 according to the invention has, compared with an RTV silicone elastomer in which 250 phr of PCM are dispersed, a change of state enthalpy per unit mass ΔH substantially greater than 70 J/g and a thermal conductivity of greater than 0.2 W·m$^{-1}$K$^{-1}$, rendering this composition C1 capable of absorbing and releasing, in a very satisfactory manner, the thermal energy required by environments that are particularly demanding as regards warming a space or fluid.

The invention claimed is:

1. A crosslinked rubber composition comprising a crosslinked mixture of:
   at least one room-temperature vulcanizing "RTV" silicone elastomer having a viscosity measured at 23° C. according to the ISO 3219 standard which is less than or equal to 5000 mPa·s, and
   at least one phase change material (PCM),
   wherein said rubber composition furthermore comprises between 150 phr and 200 phr of at least one thermally conductive filler selected from the group consisting of metals, metal oxides, nitrides, carbon-based materials and mixtures thereof.

2. The composition as claimed in claim 1, wherein said at least one silicone elastomer has a viscosity measured at 23° C. according to the ISO 3219 standard which is less than or equal to 4000 mPa·s.

3. The composition as claimed in claim 1, wherein said at least one silicone elastomer has a viscosity measured at 23° C. according to the ISO 3219 standard which is less than or equal to 1000 mPa·s.

4. The composition as claimed in claim 1, wherein said at least one PCM is not encapsulated and is in a micronized and dispersed state in the composition, in an amount of greater than 50 phr (phr: parts by weight per hundred parts of elastomer(s)).

5. The composition as claimed in claim 4, wherein said at least one PCM is present in the composition in an amount inclusively between 100 phr and 300 phr and comprises a fatty acid.

6. The composition as claimed in claim 4, wherein the composition has a change of state enthalpy per unit mass ΔH of greater than 70 J/g.

7. The composition as claimed in claim 4, wherein the composition has a change of state enthalpy per unit mass ΔH between 80 J/g and 200 J/g.

8. The composition as claimed in claim 1, wherein the composition has a thermal conductivity of greater than 0.2 W·m$^{-1}$K$^{-1}$.

9. The composition as claimed in claim 1, wherein the composition has a thermal conductivity of greater than 1 W·m$^{-1}$K$^{-1}$.

10. The composition as claimed in claim 1, wherein said at least one thermally conductive filler is selected from the group consisting of copper, aluminum, silver, zinc oxide, boron nitride, aluminum nitride, silver nitride, graphite, graphene, carbon nanotubes, and mixtures thereof.

11. The composition as claimed in claim 1, wherein said at least one silicone elastomer is of the type having two components A and B, A being a silicone and B being a curing or vulcanizing agent, and wherein said at least one silicone elastomer is crosslinked by polyaddition or polycondensation.

12. The composition as claimed in claim 11, wherein said at least one silicone elastomer is crosslinked by polyaddition and comprises a platinum-based catalyst.

13. The composition as claimed in claim 1, wherein said at least one silicone elastomer has a density measured at 23° C. according to the ISO 2781 standard which is less than 1.1 g/cm$^3$.

14. The composition as claimed in claim 1, wherein said at least one PCM has at least one melting point above 50° C.

15. A process for preparing a crosslinked rubber composition comprising the following steps:
   a) room-temperature mixing, in a liquid state, of:
      A) a component A which is a silicone, and
      B) a component B which is a curing or vulcanizing agent, said components A and B being two components of an at least one room-temperature vulcanizing "RTV" silicone elastomer having a viscosity measured at 23° C. according to the ISO 3219 standard which is less than or equal to 5000 mPa·s,
      C) and of at least one powdered PCM, and
      D) at least one thermally conductive filler in an amount inclusively between 150 phr and 200 phr selected from the group consisting of metals, metal oxides, nitrides, carbon-based materials and mixtures thereof, and
   b) crosslinking also at room temperature of the mixture obtained in step a) by polyaddition or polycondensation.

16. The process as claimed in claim 15, wherein said mixing is carried out in a blade mixer in order to obtain the crosslinkable liquid mixture wherein said at least one PCM is dispersed in the micronized state, in that this liquid mixture is poured into a mold and in that this mixture is crosslinked in this mold.

17. A tubular or sheet-shaped flexible element which comprises at least one elastomer layer capable of storing thermal energy and of restoring it, wherein said at least one layer consists of a crosslinked rubber composition as claimed in claim 1 having a Shore A hardness between 20 and 90.

18. A thermal control or regulating system wherein the system incorporates at least one flexible element as claimed in claim 17.

19. The composition as claimed in claim 1 wherein said at least one silicone elastomer has a viscosity measured at 23° C. according to ISO 3219 standard which is less than or equal to 1000 mPa·s.

20. The composition as claimed in claim 5 wherein said fatty acid is stearic acid.

21. The composition as claimed in claim 14 wherein said at least one PCM as at least one melting point above 80° C.

22. The process as claimed in claim 15 wherein the at least one thermally conductive material is selected from the group consisting of copper, aluminum, silver, zinc oxide, boron nitride, aluminum nitride, silver nitride, graphite, graphene, carbon nanotubes, and mixtures thereof.

23. A thermal control or regulating system according to claim 18 that is used for warming submerged pipelines which are submarine pipelines comporting a fluid.

24. A thermal control of regulating system according to claim 23 wherein said fluid is an oil or petroleum.

25. The composition as claimed in claim 14, wherein said at least one PCM has at least one melting point above 80° C.

26. The thermal control or regulating system of claim 18 that is used for air conditioning of a building, for warming a passenger compartment or engine of a motor vehicle, aircraft or spacecraft, for the thermal regulation of a battery, or for warming submerged pipelines.

* * * * *